(12) United States Patent
Jacobs et al.

(10) Patent No.: US 9,806,756 B1
(45) Date of Patent: Oct. 31, 2017

(54) PHONE CASE WITH SHADE

(71) Applicants: Leslie Suzanne Jacobs, Corte Madera, CA (US); Jonathan Bradley Jacobs, Corte Madera, CA (US)

(72) Inventors: Leslie Suzanne Jacobs, Corte Madera, CA (US); Jonathan Bradley Jacobs, Corte Madera, CA (US)

( * ) Notice: Subject to any disclaimer, the term of this patent is extended or adjusted under 35 U.S.C. 154(b) by 0 days.

(21) Appl. No.: 14/999,452

(22) Filed: May 10, 2016

(51) Int. Cl.
*H04B 1/3888* (2015.01)
*H04M 1/02* (2006.01)

(52) U.S. Cl.
CPC ........ *H04B 1/3888* (2013.01); *H04M 1/0202* (2013.01); *H04M 1/026* (2013.01)

(58) Field of Classification Search
CPC ................................ H04N 5/64; H04B 1/3888
See application file for complete search history.

(56) References Cited

U.S. PATENT DOCUMENTS

2014/0375901 A1* 12/2014 Stockett ................... H04N 5/64
348/838

FOREIGN PATENT DOCUMENTS

CN 202488530 U 10/2012
CN 203106077 U 8/2013

* cited by examiner

*Primary Examiner* — Tuan H Nguyen
(74) *Attorney, Agent, or Firm* — Christopher Peil; Law Office of Christopher Peil

(57) ABSTRACT

A phone case with shade including an open topped phone case that can removably retain a standard smart phone, a shade member and a shade holding frame. The shade holding frame is attached to the open topped phone case via hinge members. The shade and the frame are capable of retracting into the phone case when not in use. In the preferred embodiment a plurality of flat panels are hingedly connected to each other and capable of being folded and stacked on the underside of the phone case, or unfolded and frictionally held in position so that they shade the phone stored within the phone case.

3 Claims, 19 Drawing Sheets

PHONE CASE WITH SHADE

CROSS REFERENCE TO RELATED APPLICATIONS

Provisional patent application No. 62/284,660, Date—Oct. 6, 2015

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of mobile phone accessories and more specifically to a phone case with shade.

Smart phones having digital display screens are very common and are used by many people around the world today. When a smart phone is used in a brightly lit environment such as outdoors on a sunny day, it can be difficult to see the contents of the screen without shading the display, usually with one's hand. However, it is difficult to shade the display with one hand and simultaneously operate the phone, such as the act of typing information into the phone.

Therefore, it would be a great help to provide a shade device that is in close proximity to the smart phone that would shield the display from bright light. Many people protect their phones in cases that closely conform to the sides and back of the phone. It would be helpful to integrate a shade device into a phone case that can be deployed in bright light conditions. Several others have thought about this problem and applied for patents to solve the problem. These include:

Chinese patent application 103565066 discloses a mobile phone cover that has a rubber "accordion" shaped surround to protect against sun glare.

Chinese patent 203106077 shows a flat phone cover that includes a solar panel, that can act as a sun shield.

Chinese patent 202488530 shows a sun shielding device that has a rotating shaft that lifts up the shield to be positioned above the screen of the phone at any desired angle. And also protects from rain and snow falling down on it while in use.

Although the above sited patents disclose a shade device for smart phones, they have several deficiencies. The designs sited create a shade effect on the top of the phone, but do not address the issue of shading the side portions of the phone. These designs are helpful only if the bright light source is coming from directly above the phone. If the bright light source comes from the left or right side of the phone, the shade is not effective. Additionally, none of the sited designs stay in place easily, causing the user to use one hand to hold the shade in place. one of the designs, US application 20140150837, has the shade residing directly on top of the phone display which makes it difficult for a user to access and use the touch screen display of the phone.

BRIEF SUMMARY OF THE INVENTION

The primary object of the invention is to provide a phone case that has a deployable shade that can shield the display screen of the phone from bright light.

Another object of the invention is to provide a phone case with shade where the shade can fold or roll into a small area within or around the phone case when not in use.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a phone case with shade comprising: an open topped phone case that can removably retain a standard smart phone, a shade member, a shade holding frame, said shade holding frame attached to said open topped phone case, said shade and said frame capable of retracting into said phone case when not in use, and said shade and said frame capable of being set in a deployed position to shade the display screen of a smart phone held in said phone case.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
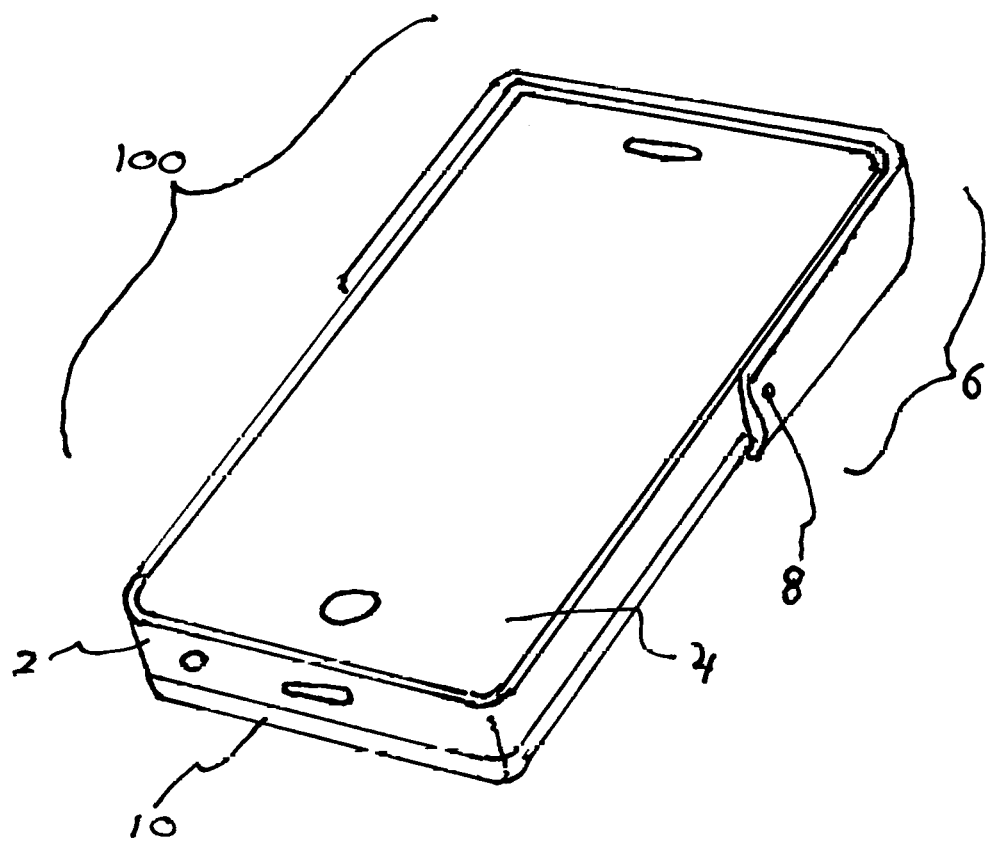
FIG. 1 is a perspective view of the invention with shade in stored position.

Referring now to FIG. 1 we see a perspective view of the invention 100 with the shade portion 6 in the stored position. A standard smart phone 4 is housed in an open topped case 2. The shade portion 6 is rotatably pinned to the case at shaft 8.

Figure 2:
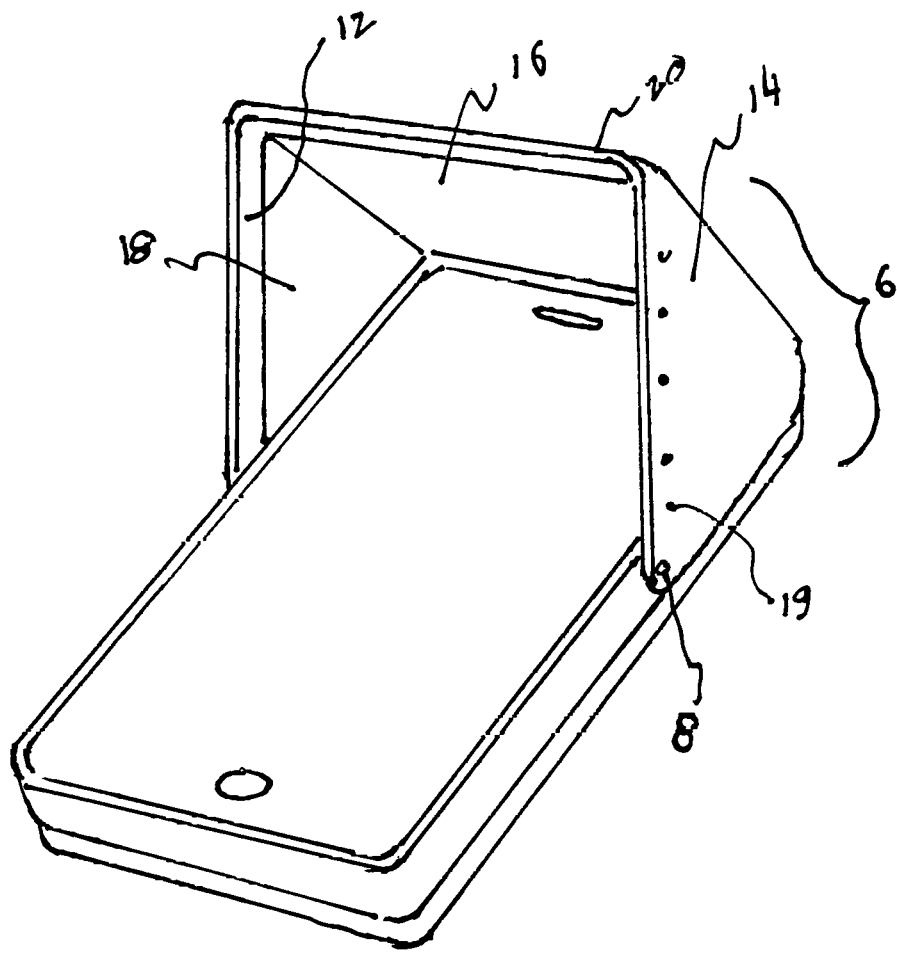
FIG. 2 is a perspective view of the invention with the shade in the deployed position.

FIG. 2 shows the present invention 100 with the shade 6 in the deployed position, the shade is made up of a flexible and retractable center sheet member 16 and two flexible side wall members 14, 18. The center sheet 16 is connected to U shaped frame 12 at leading edge 20. The frame legs pivot about hinge post 8.

Figure 3:
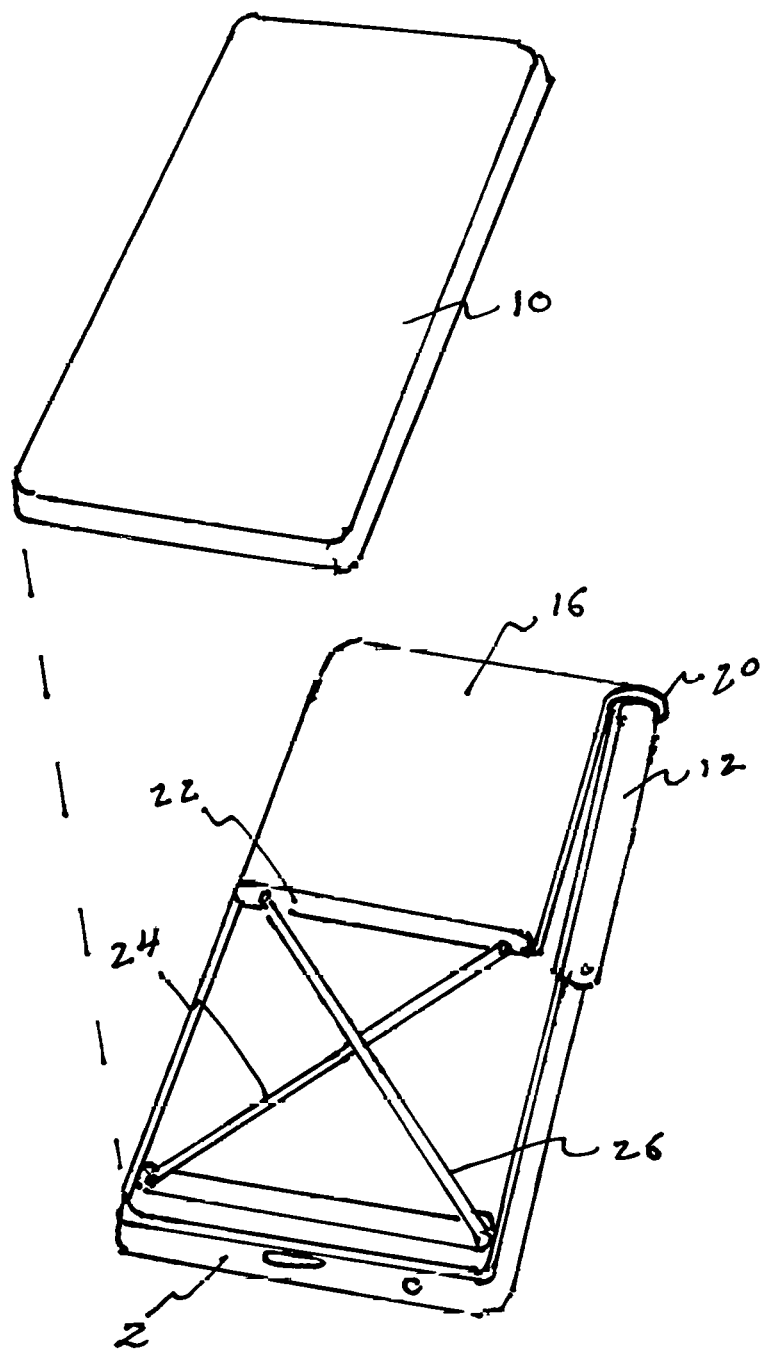
FIG. 3 is an exploded view of the shade mechanism in the stored position.

FIG. 3 is an exploded rear view showing rear cover plate 10 removed from the bottom of the phone case 2 and exposing the elastic cords 24, 26 that are attached to the trailing edge 22 of the center sheet 16. This shows the sheet 16 in the stored and non-extended position which is hidden inside cover 2.

Figure 4:
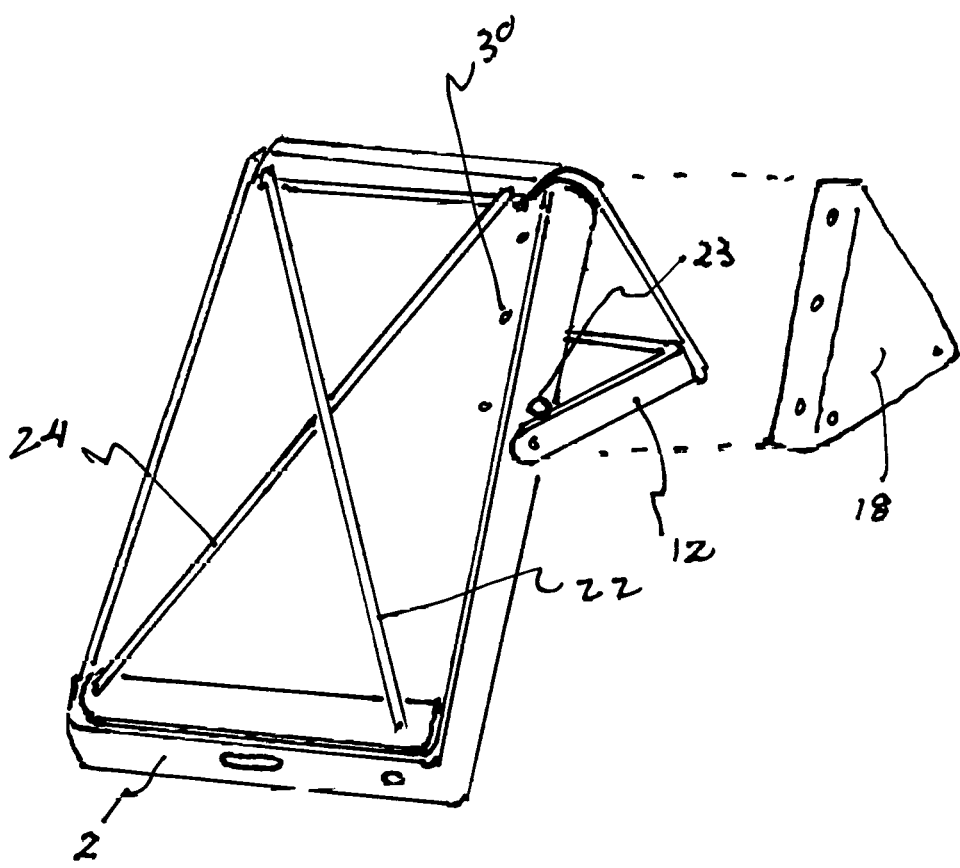
FIG. 4 is an exploded view of the shade mechanism in the deployed position.

FIG. 4 is a rear perspective view of the elastic cords 22, 24 in their extended position as sheet 16 is pulled out and used as a shade. Side shade 18 is attached to the frame 12 and to the underside of the phone holding case 2 via rivets or other standard attachment means.

Figure 5:
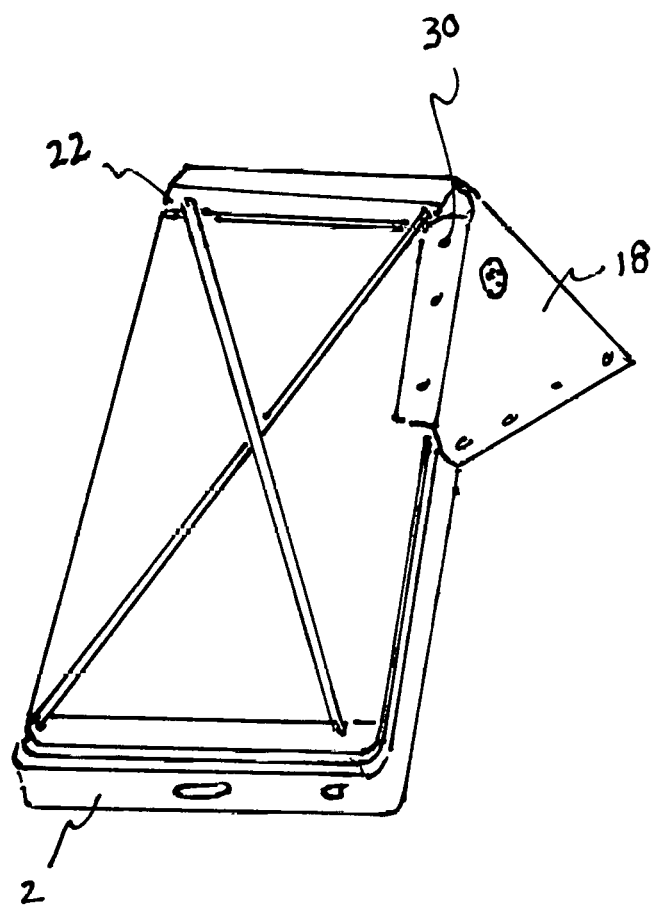
FIG. 5 is a perspective view of the rear of the phone case with protective cover removed.

FIG. 5 shows the side shade 18 installed on frame 12 and phone case 2. A similar shade is attached on the opposite side, not shown, in the same way.

Figure 6:
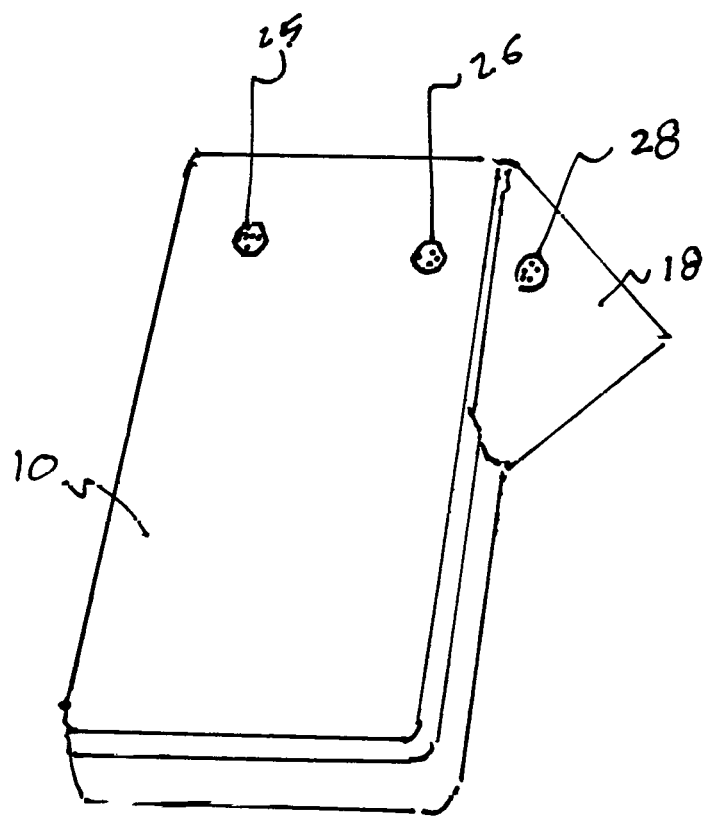
FIG. 6 is a perspective view of the rear of the phone case with shade deployed.
Figure 7:
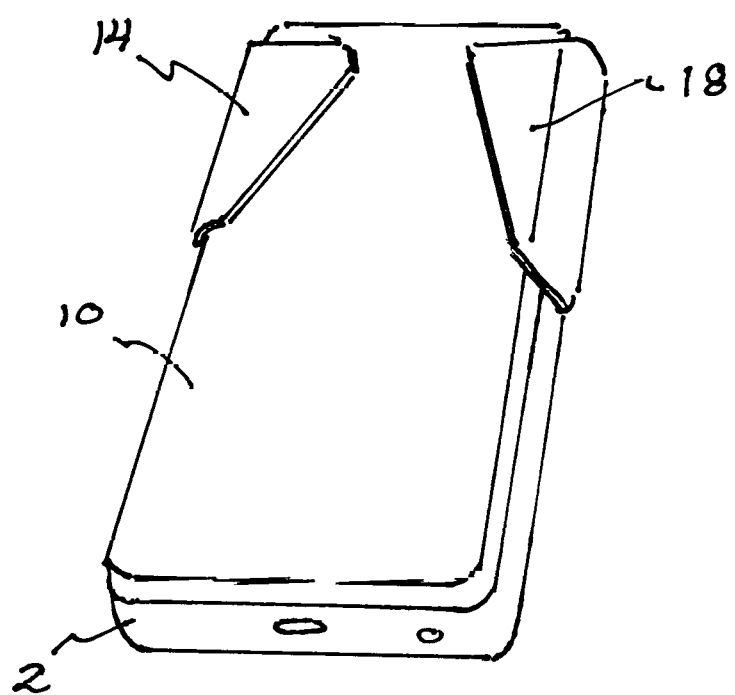
FIG. 7 is a perspective view of the rear of the phone case with shade in storage position.

FIG. 6 shows the underside of the invention 100 with the cover plate 10 in place. Velcro loop member 28 is fixed to the shade and can engage Velcro hook member 26 when the shade 6 is in the stored position as shown in FIG. 7.

Figure 8:
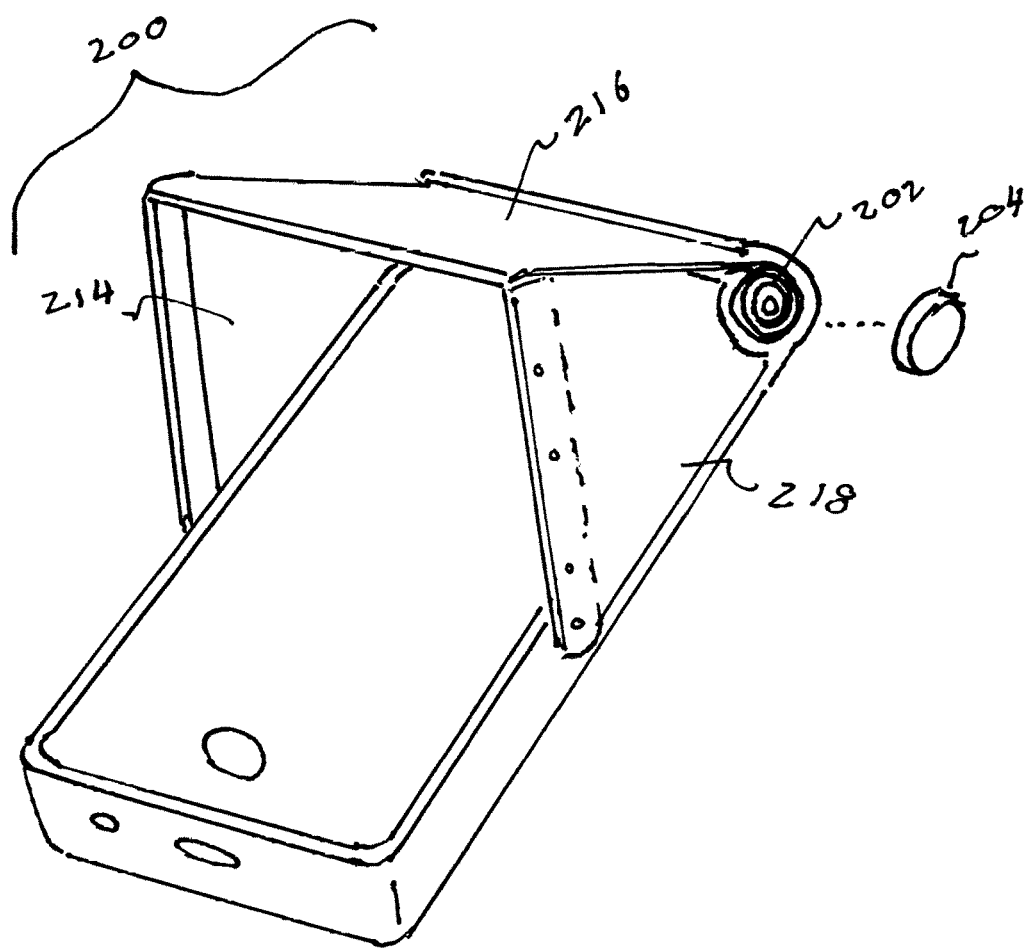
FIG. 8 is a perspective view of a first alternate embodiment showing a roll up shade deployed.

FIG. 8 shows an alternate embodiment of the invention 200 where sheet 216 can be rolled into a case 202 for storage. The sheet attached to a spring biased shaft that allows the sheet 216 to be automatically pulled into the case 202 for storage. The side sheets 218 operate in a similar fashion to the first embodiment of the invention 100.

Figure 9:
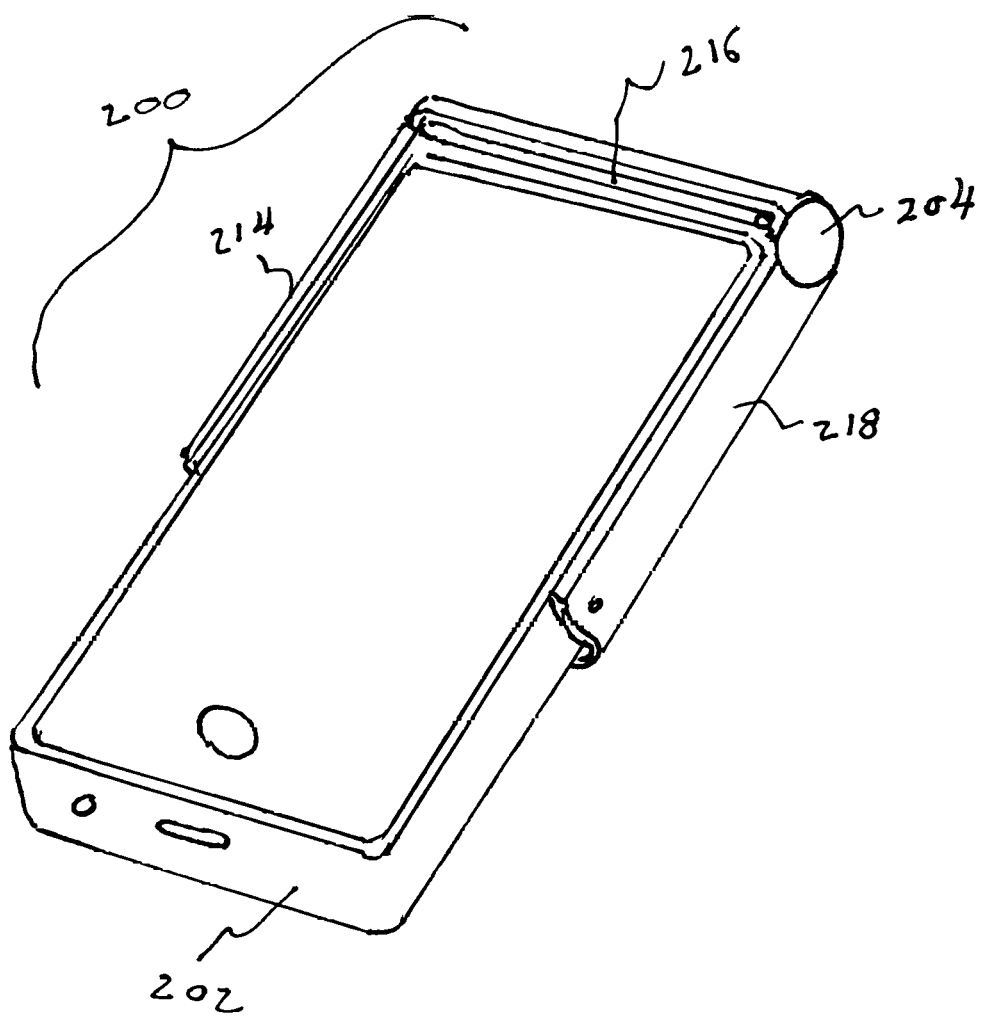
FIG. 9 is a perspective view of the first alternate embodiment with roll up shade in storage position.

FIG. 9 shows the embodiment 200 in with the shade in the stored position.

Figure 10:
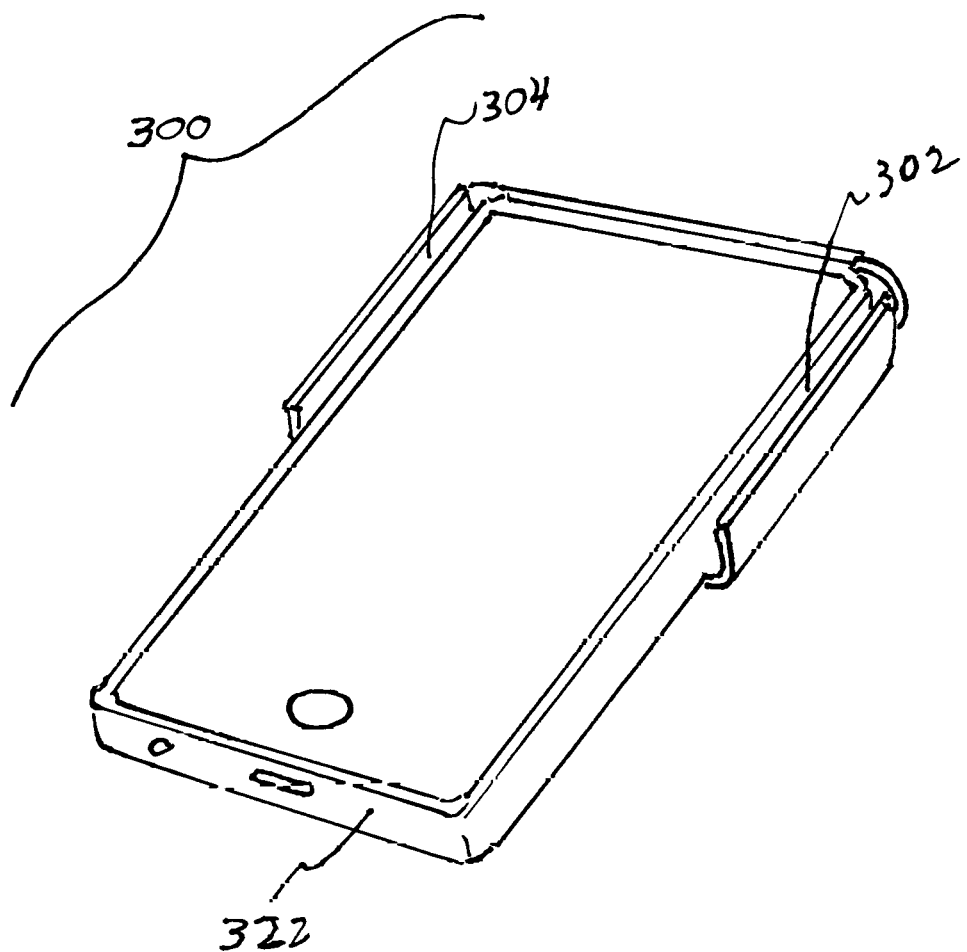
FIG. 10 is a perspective view of a second alternate embodiment having shade members with living hinges in stored positron.
Figure 11:
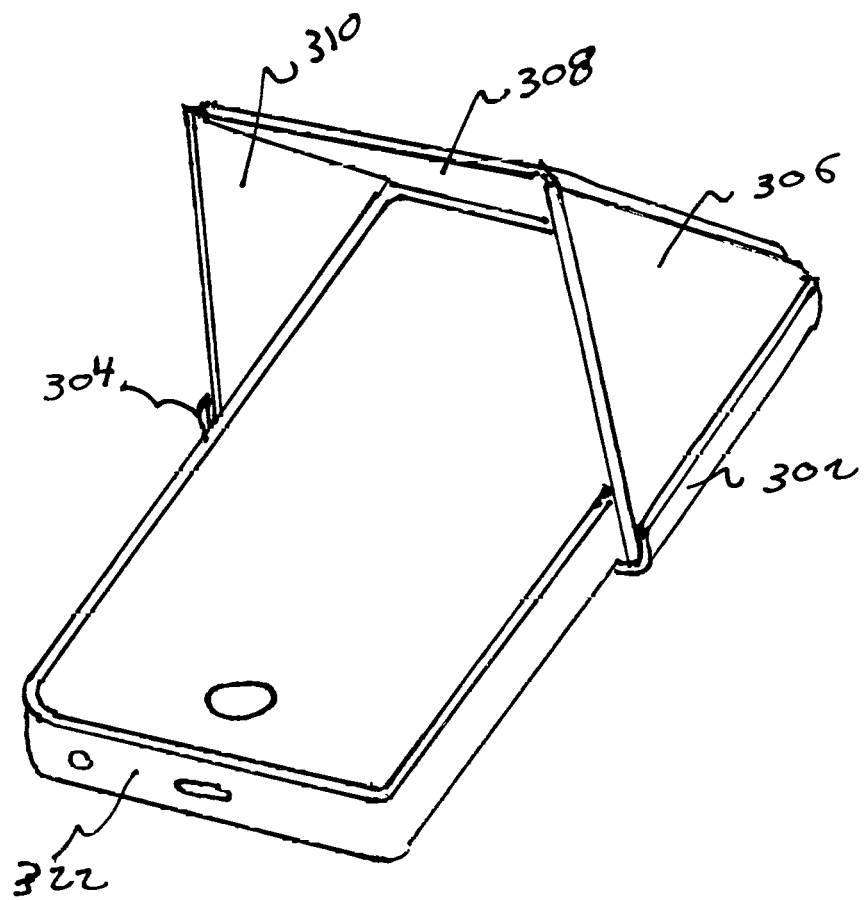
FIG. 11 is a perspective view of the second alternate embodiment in the deployed position.
Figure 12:
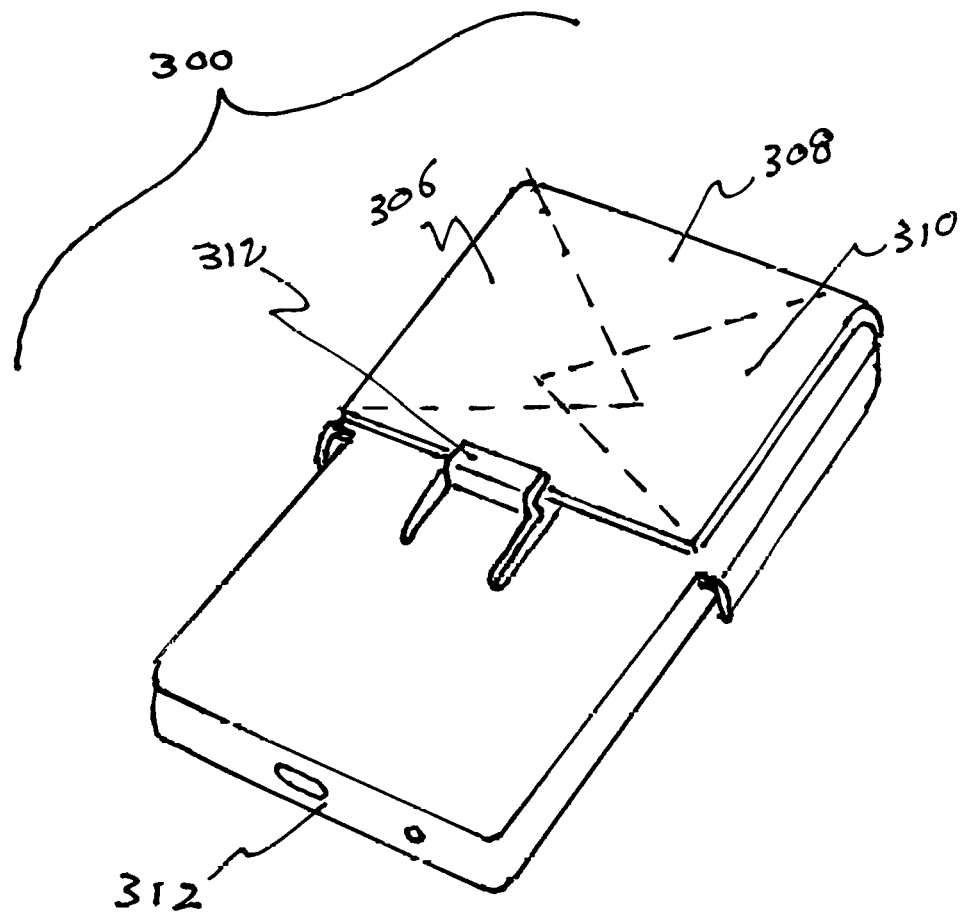
FIG. 12 is a rear view of the second alternate embodiment in the stored position.

FIG. 10 is a perspective view of a third embodiment of the invention 300 where track members 302, 304 hold side shades 306, 310 in place as shown in FIG. 11. The center sheet 308 attaches to side shades 306, 310 by living hinges molded into the polypropylene formed center 308 and side sheets 306, 310. The center sheet 308 can fold back to be parallel with the back of the phone case 322 as shown in FIG. 12, and side sheets 306, 310 are stored under the center sheet 1210 as shown by dotted lines. Resilient L shaped retaining member 312 holds the shade assembly in place for storage. To use, a person pulls back on the L shaped retainer and releases the shade for deployment.

Figure 13:
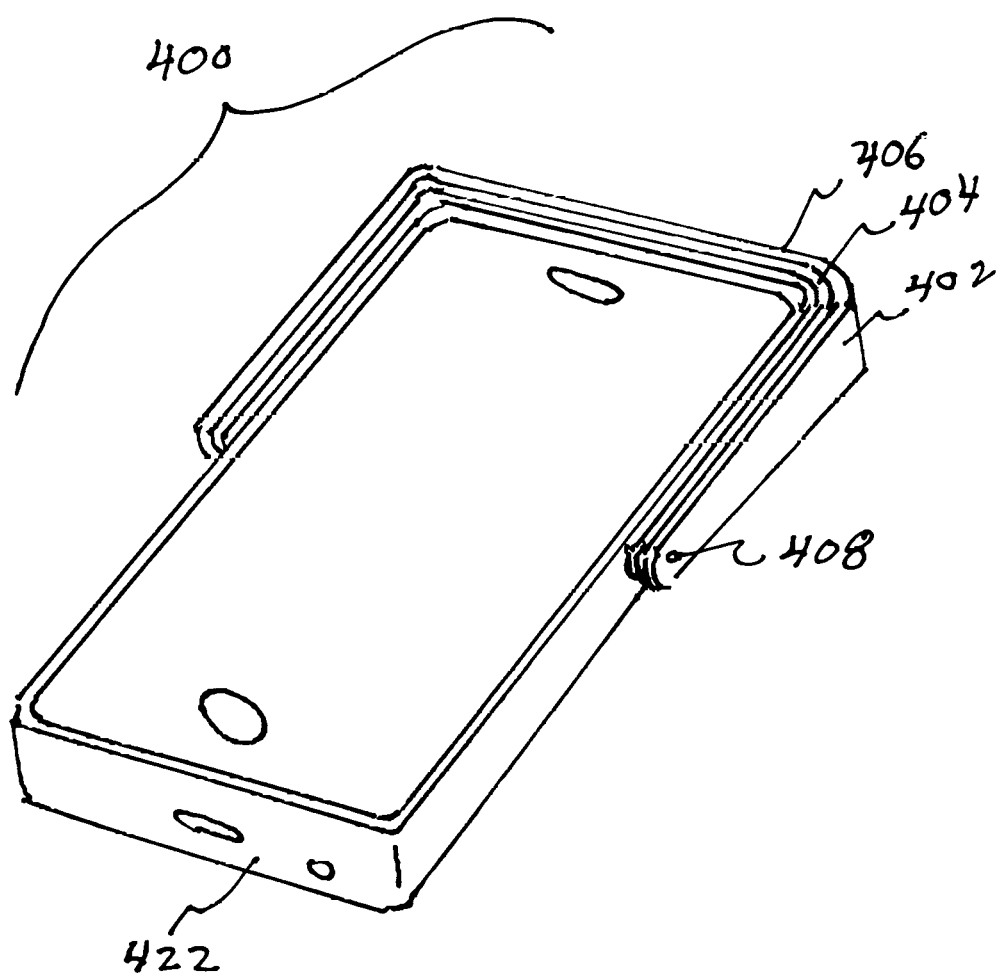
FIG. 13 is a front perspective view of a third alternate embodiment of the invention in the stored position.

FIG. 13 shows a fourth embodiment of the invention 400 where a plurality of U shaped members 402, 404, 406 are pinned 408 to the side wall of the phone case 422.

Figure 14:
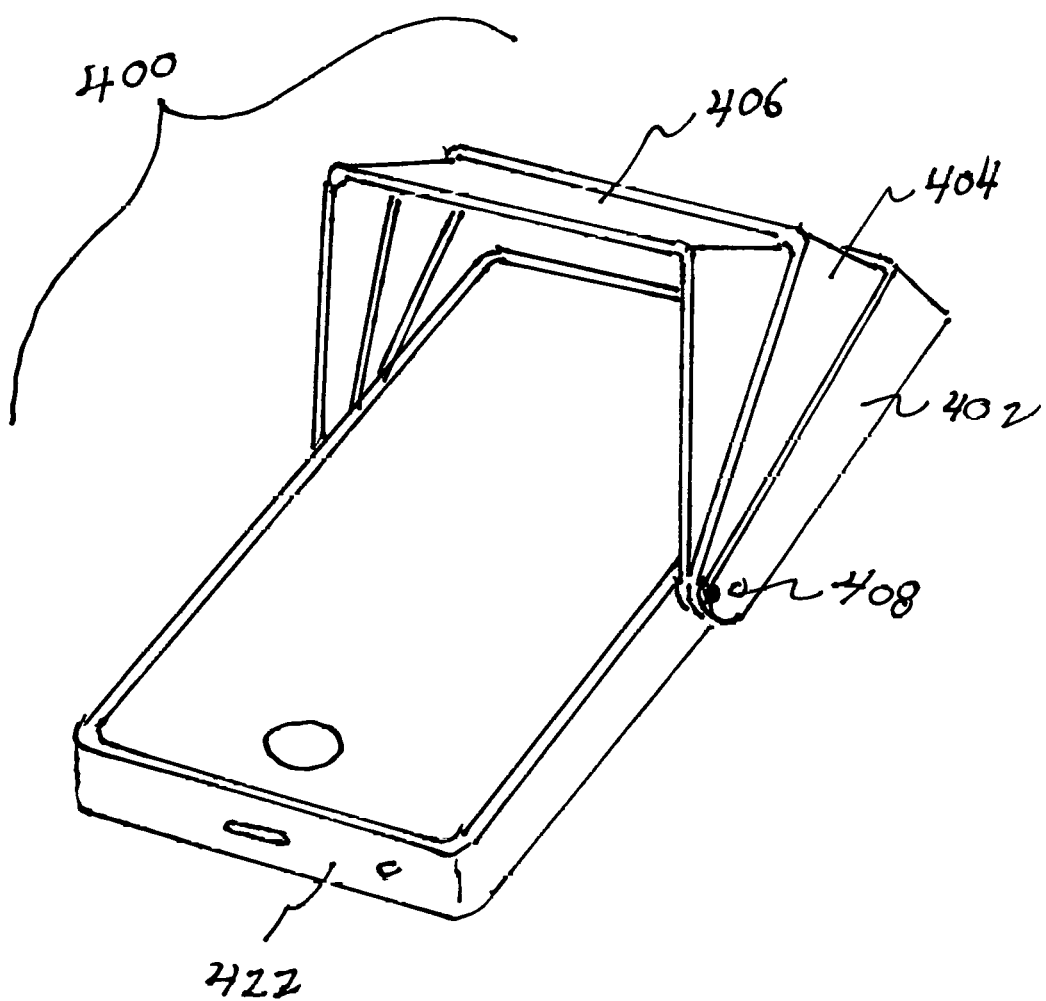
FIG. 14 is a front perspective view of the fourth alternate embodiment of the invention in the deployed position.

FIG. 14 shows the fourth embodiment 400 in the deployed position where U shaped members 402, 404, 406 are rotated up and form a shade.

Figure 15:
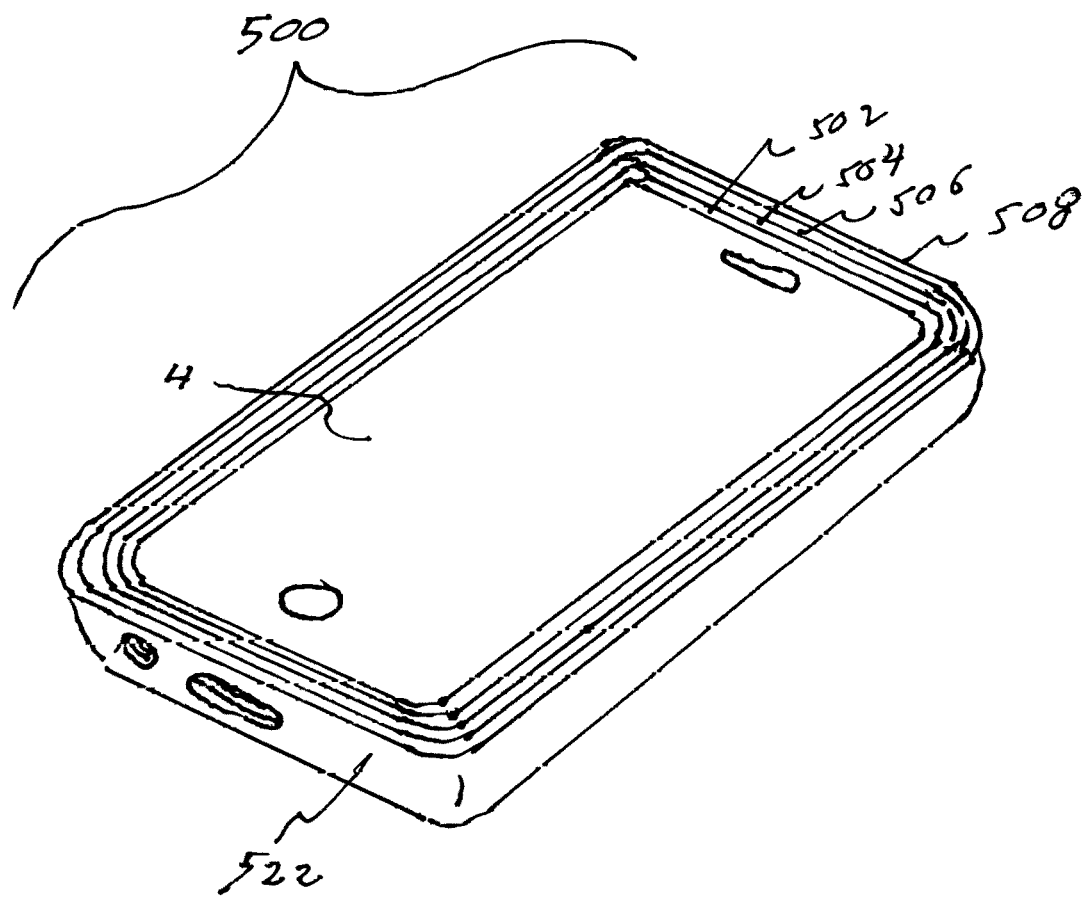
FIG. 15 is a perspective view of the fifth alternate embodiment in the stored position.
Figure 16:
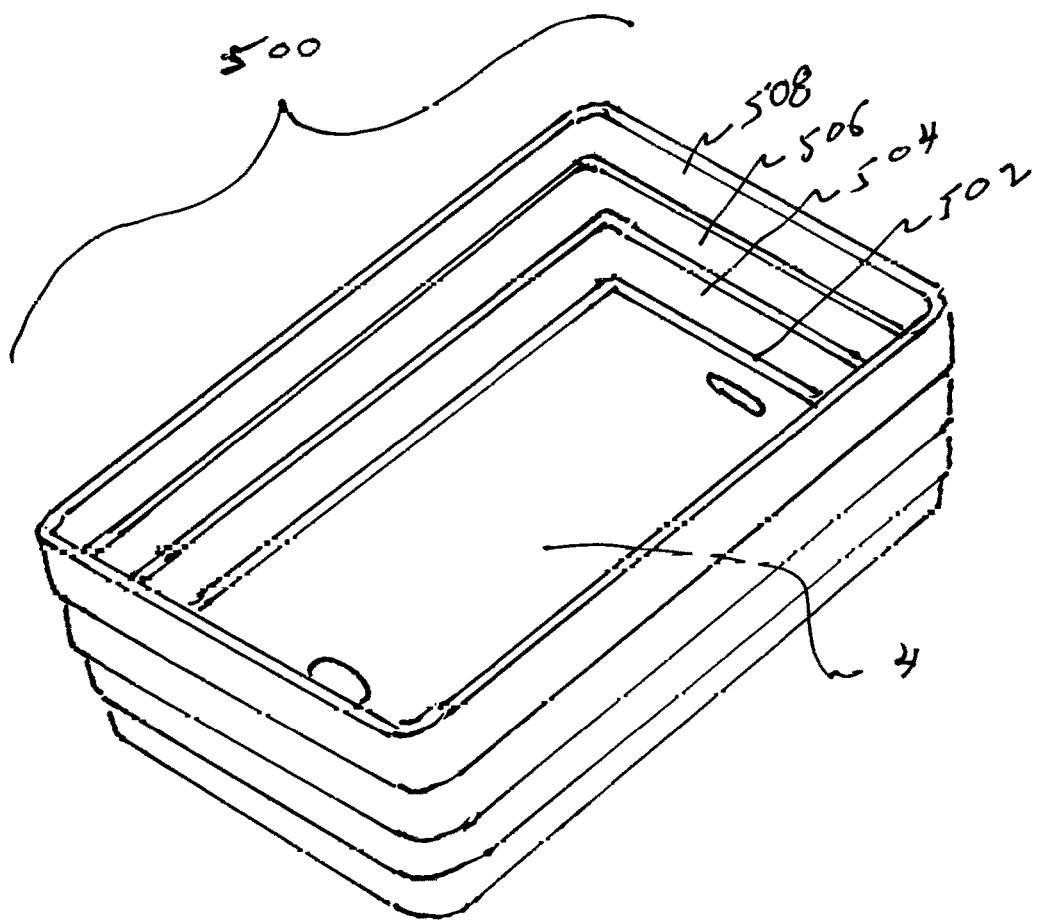
FIG. 16 is a perspective view of the fifth embodiment in the deployed position.

FIG. 15 is a perspective view of a fifth embodiment 500 in the stored position. A plurality of frame members 502, 504, 506, 508 surround the phone 4 and can be lifted to form surrounding walls, as shown in FIG. 16 to shade the phone 4 from bright light.

Figure 17:
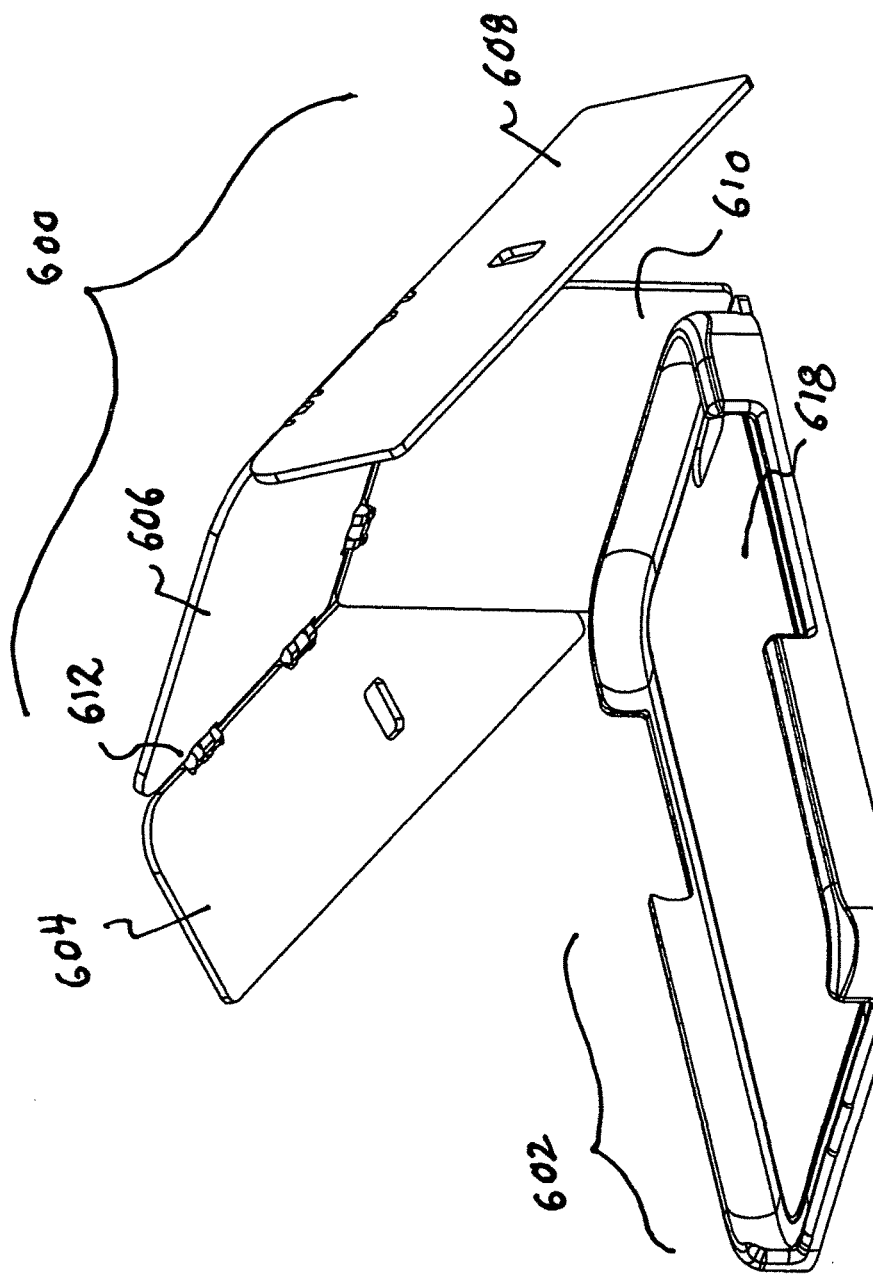
FIG. 17 is a perspective view of the sixth embodiment in the deployed position

FIG. 17 is a perspective view of a sixth and preferred embodiment of the present invention 600. A series of hinged 612 panels 604, 606, 608, 610 can fold to be placed in a position that shades the screen of a phone stored in phone case 602. The hinges 612 are all identical and are designed to be a very tight fit that causes a fiction based holding effect where the panels remain wherever the user sets them, thereby providing infinite adjustability. Optionally, an additional panel can be hingedly joined to the front edge of panel 606 giving greater shading ability. Also, optionally, a hinged easel type kickstand member can be attached to the back side of phone case 602 panel 618 to allow the case to be propped up during use. The panels are preferably injection molded from nylon which has a natural spring quality and will not take a cold set when the hinge parts are forced together for extended periods of time.

Figure 18:
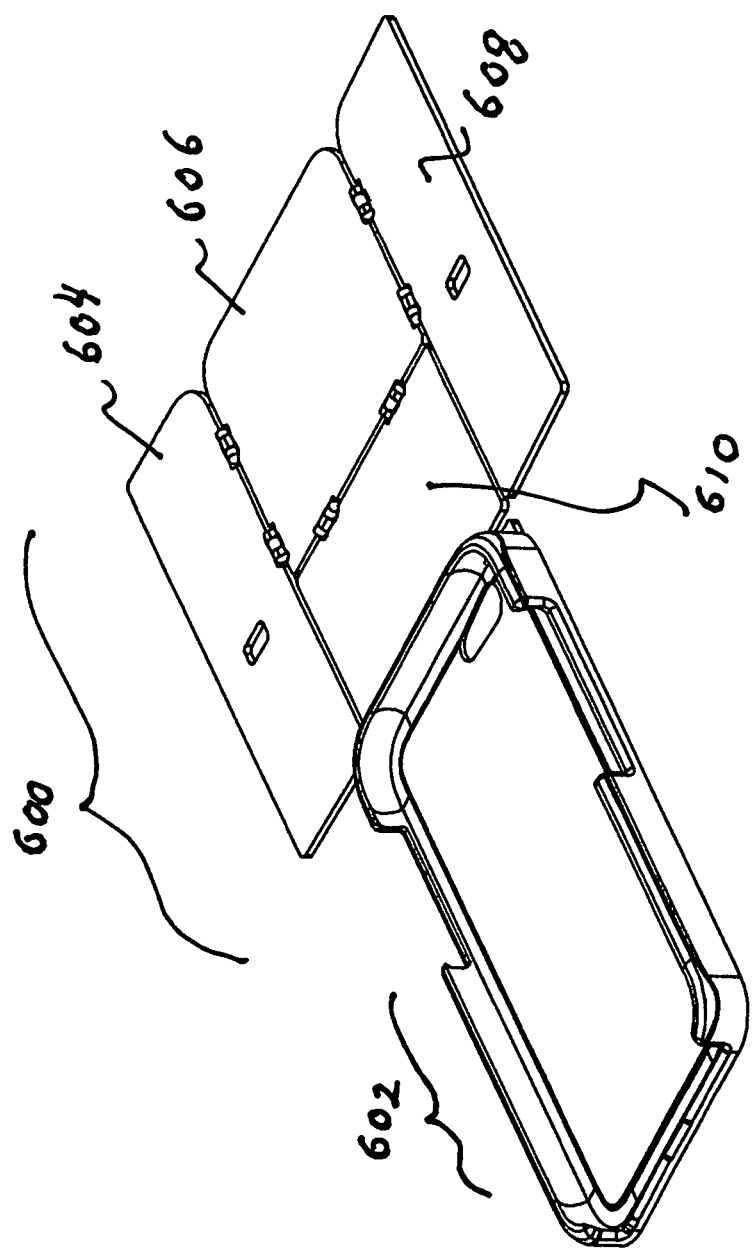
FIG. 18 is a perspective view of the sixth embodiment in the flattened position.

FIG. 18 is a perspective view of the sixth embodiment 600 with the panels 604, 606, 608, 610 laid out in a flat position before being folded into the desired shade making position shown in FIG. 17.

Figure 19:
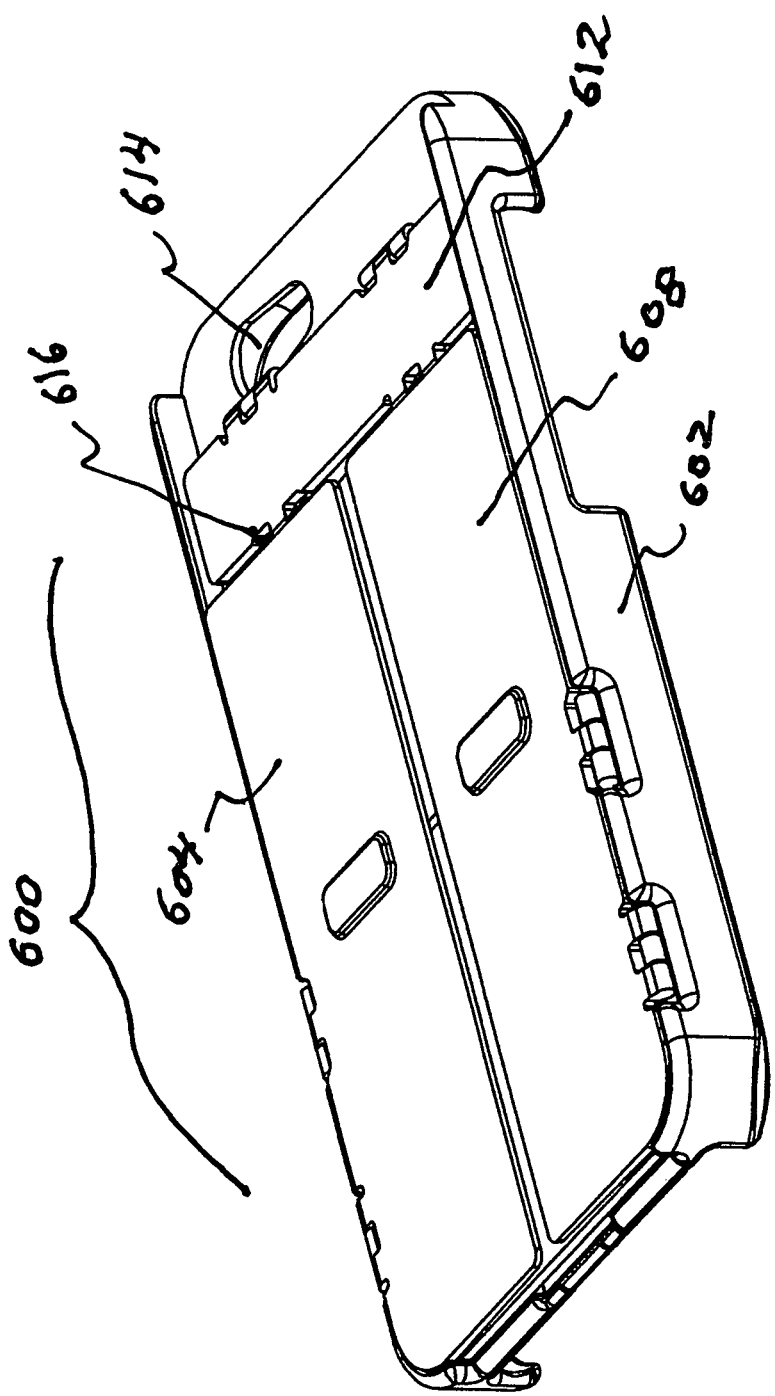
FIG. 19 is a perspective view of the sixth embodiment in the stored position.

FIG. 19 is a rear perspective view of the sixth embodiment 600 showing the panels 604, 606, 608, 610 in the folded and stored position. This view also shows panel 612 which allows the shade 600 to be clear of the camera aperture 614 and yet still fold at joint 616 to allow the shade 600 to rotate up and over the phone case 602. This position shows that, at first glance, the case 600 resembles many other protective phone cases, however it magically allows a user to quickly and easily deploy a sun shade when needed.

Although the above described embodiments are used with a smart phone, it is also possible to use the same embodiments with other mobile electronic devices such as a tablet or lap top computer.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A phone case with shade comprising:
   an open topped phone case that can removeably retain a standard smart phone;
   a shade member comprising:
   a plurality of panels each having integral mating hinge members hingedly connected to each other, wherein at least one of said plurality of panels is also hingedly connected said phone case;
   said panels capable of being stored in a flat stacked condition on an underside of said phone case and also capable of being unfolded out and over the phone to act as a phone shade;
   the hinge members being tightly interconnected to each other enabling said panels to remain set in their shade position by frictional force and capable of being repositioned by the user as needed;
   said shade being capable of being set in a deployed position to shade the display screen of the smart phone.

2. The phone case with shade of claim 1, further comprising:
   a hinged easel-type kickstand member attached to a back side of said phone case to allow said phone case to be propped up during use.

3. The phone case with shade of claim 1, further comprising:
   a hinged panel that allows said shade to clear a camera aperture on the smart phone.

\* \* \* \* \*